US011763503B2

(12) United States Patent
Horvath et al.

(10) Patent No.: US 11,763,503 B2
(45) Date of Patent: Sep. 19, 2023

(54) MEDIA ALTERATION BASED ON VARIABLE GEOLOCATION METADATA

(71) Applicant: Life Impact Solutions, Inc., Irvine, CA (US)

(72) Inventors: Aaron Horvath, Ladera Ranch, CA (US); Neal Shaw, Shawnee, KS (US)

(73) Assignee: Life Impact Solutions, Irvine, CA (US)

( * ) Notice: Subject to any disclaimer, the term of this patent is extended or adjusted under 35 U.S.C. 154(b) by 0 days.

(21) Appl. No.: 16/284,119

(22) Filed: Feb. 25, 2019

(65) Prior Publication Data

US 2020/0273225 A1 Aug. 27, 2020

(51) Int. Cl.
*G06F 16/00* (2019.01)
*G06T 11/60* (2006.01)
*G06F 16/587* (2019.01)

(52) U.S. Cl.
CPC ............ *G06T 11/60* (2013.01); *G06F 16/587* (2019.01)

(58) Field of Classification Search
CPC ............................... G06T 11/60; G06F 16/587
See application file for complete search history.

(56) References Cited

U.S. PATENT DOCUMENTS

| | | | | |
|---|---|---|---|---|
| 8,554,670 B1* | 10/2013 | Blank | ................. | G06Q 50/01 705/26.1 |
| 8,560,954 B1* | 10/2013 | Nakajima | .............. | G06Q 50/01 715/753 |
| 8,595,317 B1* | 11/2013 | Harris | ................. | G06F 16/9537 709/219 |
| 8,612,533 B1* | 12/2013 | Harris | .................. | G06F 16/487 707/723 |
| 8,639,767 B1* | 1/2014 | Harris | ................. | H04L 12/1895 709/202 |
| 9,112,936 B1* | 8/2015 | Poletto | .................... | G06F 16/58 |
| 9,230,355 B1* | 1/2016 | Ahuja | ................... | G06F 3/0485 |
| 9,361,889 B2* | 6/2016 | Chao | .................... | G01C 21/206 |
| 9,485,318 B1* | 11/2016 | Harris | ................... | H04W 4/029 |
| 9,569,451 B1* | 2/2017 | Crager | .................... | G06F 16/16 |
| 9,665,959 B2* | 5/2017 | Hatano | .................. | G06V 20/30 |
| 9,754,397 B1* | 9/2017 | Piemonte | ................ | G06T 11/60 |
| 9,922,437 B1* | 3/2018 | Baron | ..................... | G06T 11/60 |
| 10,109,092 B1* | 10/2018 | Hitchings, Jr. | ......... | G06T 11/60 |

(Continued)

FOREIGN PATENT DOCUMENTS

CA 2937450 A1 * 1/2017 ......... G06Q 30/0201
CN 105745321 B * 12/2019 ................ A61P 9/00

(Continued)

OTHER PUBLICATIONS

International Search Report and Written Opinion in corresponding International Application No. PCT/US2020/019462 dated Jun. 24, 2020, 8 pages.

(Continued)

*Primary Examiner* — Shahid K Khan
(74) *Attorney, Agent, or Firm* — Fish IP Law, LLP (57) ABSTRACT

A method for composing context images with user media captures contemplates selecting, at a first location, a context image associated with the first location to incorporate into captured images at a second location. The method further contemplates that the selected context images and user media captures specific to the first location are combined to create a composite image at the second location.

12 Claims, 5 Drawing Sheets

(56) References Cited

U.S. PATENT DOCUMENTS

| | | | |
|---|---|---|---|
| 10,154,192 B1* | 12/2018 | Sehn | H04N 23/61 |
| 10,157,449 B1* | 12/2018 | Chang | G06F 16/5838 |
| 10,191,945 B2* | 1/2019 | Rishe | G06F 16/29 |
| 2008/0163379 A1* | 7/2008 | Robinson | G06Q 30/0222 |
| | | | 715/738 |
| 2009/0019013 A1* | 1/2009 | Tareen | G06F 16/219 |
| 2010/0114739 A1* | 5/2010 | Johnston | G06Q 30/06 |
| | | | 705/26.1 |
| 2010/0130226 A1* | 5/2010 | Arrasvuori | H04W 4/029 |
| | | | 455/456.1 |
| 2010/0251101 A1* | 9/2010 | Haussecker | H04N 23/698 |
| | | | 715/243 |
| 2011/0099070 A1 | 4/2011 | Eliason | |
| 2011/0196888 A1* | 8/2011 | Hanson | G06F 16/58 |
| | | | 707/769 |
| 2012/0047147 A1* | 2/2012 | Redstone | H04W 4/02 |
| | | | 707/769 |
| 2012/0233158 A1* | 9/2012 | Braginsky | G06F 16/951 |
| | | | 707/723 |
| 2012/0297368 A1* | 11/2012 | Bingell | G06F 9/44589 |
| | | | 717/126 |
| 2013/0110631 A1* | 5/2013 | Mitchell | H04W 4/185 |
| | | | 705/14.58 |
| 2013/0117389 A1* | 5/2013 | Yamada | G08G 1/096775 |
| | | | 709/206 |
| 2013/0124980 A1* | 5/2013 | Hudson | G06T 11/60 |
| | | | 715/779 |
| 2013/0246397 A1* | 9/2013 | Farver | G06Q 30/0252 |
| | | | 709/206 |
| 2013/0325964 A1* | 12/2013 | Berberat | H04L 51/222 |
| | | | 709/204 |
| 2013/0340089 A1* | 12/2013 | Steinberg | G06Q 50/01 |
| | | | 726/27 |
| 2014/0006486 A1* | 1/2014 | Bintliff | H04L 51/222 |
| | | | 709/203 |
| 2014/0063063 A1* | 3/2014 | Scott | G06T 11/60 |
| | | | 345/633 |
| 2014/0111544 A1* | 4/2014 | Hammond | G06T 19/006 |
| | | | 345/633 |
| 2014/0236916 A1* | 8/2014 | Barrington | G06Q 10/10 |
| | | | 707/706 |
| 2014/0259113 A1* | 9/2014 | Harris | G06F 21/60 |
| | | | 709/201 |
| 2014/0280278 A1* | 9/2014 | Harris | G06T 19/006 |
| | | | 707/758 |
| 2014/0372436 A1* | 12/2014 | Makki | G06F 16/95 |
| | | | 707/736 |
| 2015/0002506 A1* | 1/2015 | Saari | G06T 11/60 |
| | | | 345/419 |
| 2015/0097865 A1* | 4/2015 | Subramanian | G06T 11/60 |
| | | | 345/633 |
| 2015/0205917 A1* | 7/2015 | Mabotuwana | G06T 11/60 |
| | | | 382/128 |
| 2015/0281549 A1* | 10/2015 | Fridental | H04N 21/632 |
| | | | 348/211.3 |
| 2015/0294367 A1* | 10/2015 | Oberbrunner | G06Q 30/0252 |
| | | | 705/14.66 |
| 2016/0005077 A1* | 1/2016 | McDevitt | H04W 4/021 |
| | | | 705/14.58 |
| 2016/0012137 A1* | 1/2016 | Cudak | G06F 16/4393 |
| | | | 707/706 |
| 2016/0085863 A1* | 3/2016 | Allen | G06Q 30/08 |
| | | | 707/754 |
| 2016/0226836 A1* | 8/2016 | Garcia | H04L 63/061 |
| 2016/0352846 A9* | 12/2016 | Gauglitz | G06Q 30/06 |
| 2017/0161382 A1* | 6/2017 | Ouimet | G06F 16/434 |
| 2017/0228785 A1* | 8/2017 | Evje | G06Q 30/0275 |
| 2017/0270180 A1* | 9/2017 | State | G06F 16/285 |
| 2017/0289756 A1* | 10/2017 | Barrand | H04L 43/16 |
| 2018/0091460 A1* | 3/2018 | DeLuca | H04L 51/222 |
| 2018/0113914 A1* | 4/2018 | Mehedy | G06F 16/248 |
| 2019/0227022 A1* | 7/2019 | Harley-Trochimczyk | |
| | | | A61B 5/0022 |
| 2020/0120097 A1* | 4/2020 | Amitay | H04L 41/28 |
| 2020/0299749 A1* | 9/2020 | Kwong | G01N 33/582 |
| 2021/0113653 A1* | 4/2021 | Pakyari | C07K 14/7051 |

FOREIGN PATENT DOCUMENTS

| | | | |
|---|---|---|---|
| KR | 20150058607 | 5/2015 | |
| KR | 1020150058607 | 5/2015 | |
| WO | WO-2021061605 A1 * | 4/2021 | G06F 16/2329 |

OTHER PUBLICATIONS

International Search Report dated Jun. 24, 2020, for related PCT application No. PCT/US20/19462.

* cited by examiner

MEDIA ALTERATION BASED ON VARIABLE GEOLOCATION METADATA

FIELD OF THE INVENTION

The field of the invention is production of composite images.

BACKGROUND

Social media-based image composing methods have become a common means for businesses to expand their presence for the digital age. The advantage of these composing methods is the capability to reach people who are interested in specific products or services. However, conventional methods have considerable drawbacks. Typically, businesses and companies advertise their products or services based on relevant content. It is expensive for businesses to purchase and place context images like photos and messages on popular social media platforms (e.g., Facebook®, Instagram®, Twitter®, etc.). Today, companies need to pay more for branding and messaging to appear in social media activity feeds. This is costly and slower than the flow of information which is provided by social media users and those who consume content posted by other users.

Additionally, these paid branded messages are not always relevant. For example, a company located in a particular city may not benefit if branding is placed in social media feeds related to users who travel to a variety of different locations. On the other hand, some users can check-in to a location, which helps businesses acquire greater exposure.

Importantly, social media users often take pictures in particular locations (e.g., a vacation) and do not view, edit, or share the taken pictures until they get home on a later date. Since current social media and geotagging technologies focus on using real-time geolocation data, current technologies do not offer a solution to the problem of requiring users to be in a particular geolocation to take advantage of geolocation-dependent features. For example, a user who takes photos on a vacation in a foreign country cannot access particular photo filters associated with a particular geolocation. As such, the user is severely limited by real-time restrictions, which requires a user to either edit and share a photo shortly after taking it or to forgo the benefits of geolocation-specific features to avoid the inconvenience of sharing a photo in substantially real-time.

Though there have been recent efforts to allow users to directly engage in social media image compositing, efforts have been limited to substantially real-time advertising. For example, the inclusion of geolocation-based tags, including, for example, business context images attached to a particular location, uses the current geolocation of a user. Based on the current geolocation of the user, conventional social media advertising efforts require users to take photos/write social media posts and tag the posts with manually obtained context images within a particular geolocation at a particular time. Further, the preceding steps are naturally followed by the additional steps of identifying relevant parties to send the post to and uploading posts to social media. These steps require users to take a pause in their activities to engage with social media, which can cause undesirable interruptions throughout the day.

U.S. Pat. No. 10,157,449 B1 to Chang teaches geolocation-based image filters. Chang teaches a method of recognizing the subject of a user-captured image and then presenting photo filters that a user can swipe through to apply to the photo. However, Chang merely discloses that image filters are limited to the current location of the object, which is further determined by the current geolocation of a client device relative to the fixed location of the object.

U.S Patent Application Pub. No. 2017/0161382 to Ouimet teaches geolocation-based media overlays. Ouimet teaches that media overlays can be merchant context images that are present at the current location of a client device. However, Ouimet merely discloses that merchant context images are presented as media overlays within a particular geolocation within which a client device must be located.

Thus, there is still a need for geolocation-dependent social media context images that use geolocation metadata associated with a photo to apply geolocation-dependent context images outside a designated geolocation at a later time. There is also a need for systems and methods of preselecting social media context images to apply to a user's social media posts when a user enters into a particular geolocation.

SUMMARY OF THE INVENTION

The following description includes information that may be useful in understanding the present invention. It is not an admission that any of the information provided herein is prior art or relevant to the presently claimed invention, or that any publication specifically or implicitly referenced is prior art.

The inventive subject matter enables user querying of a third-party source to find a geolocation-dependent social media context image, associating that context image with a user media capture image (e.g. a photo), and applying the geolocation-dependent context images to the user media capture image.

Another aspect of the inventive subject matter is preselecting social media context images to apply to a user's social media posts when a user enters into a particular geolocation. When the user conducts a media capture image, the system will apply the preselected context image for the associated geolocation of the media capture image to a social media post comprising the media capture image.

Various resources, features, aspects and advantages of the inventive subject matter will become more apparent from the following detailed description of preferred embodiments, along with the accompanying drawing figures in which like numerals represent like components.

The following discussion provides many example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

DETAILED DESCRIPTION

It should be noted that while the following description is drawn to a computer-based scheduling system, various alternative configurations are also deemed suitable and may employ various computing devices including servers, interfaces, systems, databases, engines, controllers, or other types of computing devices operating individually or collectively. One should appreciate the computing devices comprise a processor configured to execute software instructions stored on a tangible, non-transitory computer readable storage medium (e.g., hard drive, solid state drive, RAM, flash, ROM, etc.). The software instructions preferably configure the computing device to provide the roles, responsibilities, or other functionality as discussed below with respect to the disclose apparatus. In especially preferred embodiments, the various servers, systems, databases, or interfaces exchange data using standardized protocols or algorithms, possibly based on HTTP, HTTPS, AES, public-private key exchanges, web service APIs, known financial transaction protocols, or other electronic information exchanging methods. Data exchanges preferably are conducted over a packet-switched network, the Internet, LAN, WAN, VPN, or other type of packet switched network.

One should appreciate that the disclosed techniques provide many advantageous technical effects including facilitating the scheduling of events, facilitating the efficient manufacture of one or more goods, and any other application of genetic algorithms known in the art.

The following discussion provides many example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

Figure 1:
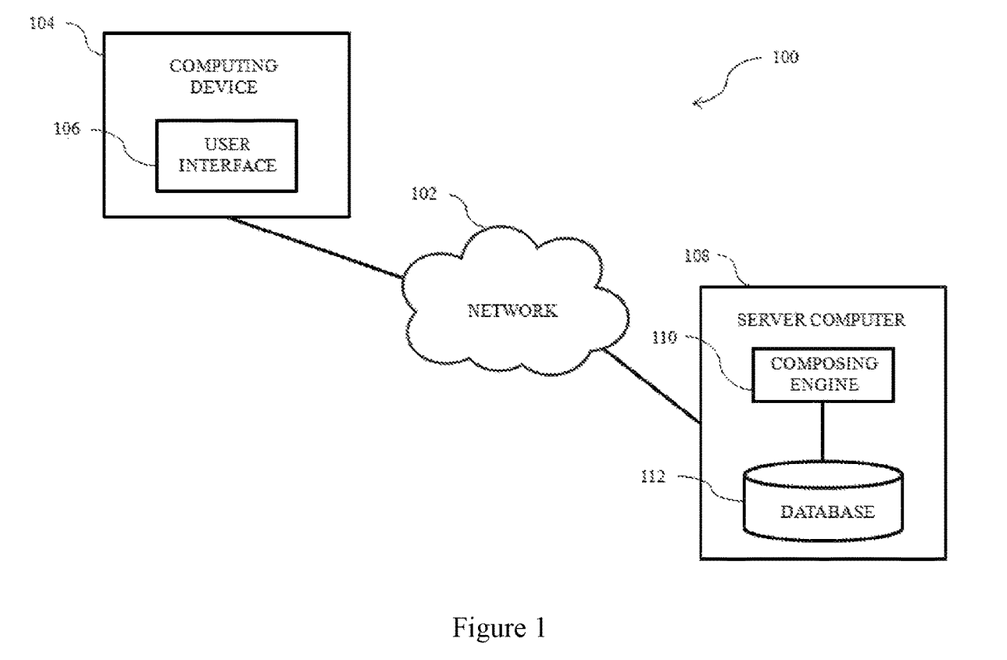
FIG. 1 is a functional block diagram illustrating a distributed data processing environment.

FIG. 1 is a functional block diagram illustrating a distributed data processing environment.

The term "distributed" as used herein describes a computer system that includes multiple, physically distinct devices that operate together as a single computer system. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Distributed data processing environment 100 includes computing device 104 and server computer 108, interconnected over network 102. Network 102 can include, for example, a telecommunications network, a local area network (LAN), a wide area network (WAN), such as the Internet, or a combination of the three, and can include wired, wireless, or fiber optic connections. Network 102 can include one or more wired and/or wireless networks that are capable of receiving and transmitting data, voice, and/or video signals, including multimedia signals that include voice, data, and video information. In general, network 102 can be any combination of connections and protocols that will support communications between computing device 104, server computer 108, and any other computing devices (not shown) within distributed data processing environment 100.

It is contemplated that computing device 104 can be any programmable electronic computing device capable of communicating with various components and devices within distributed data processing environment 100, via network 102. It is further contemplated that computing device 104 can execute machine readable program instructions and communicate with any devices capable of communication wirelessly and/or through a wired connection. Computing device 104 includes an instance of user interface 106.

User interface 106 provides a user interface to composing engine 110. Preferably, user interface 106 comprises a graphical user interface (GUI) or a web user interface (WUI) that can display one or more of text, documents, web browser windows, user option, application interfaces, and operational instructions. It is also contemplated that user interface can include information, such as, for example, graphics, texts, and sounds that a program presents to a user and the control sequences that allow a user to control a program.

In some embodiments, user interface can be mobile application software. Mobile application software, or an "app," is a computer program designed to run on smart phones, tablet computers, and any other mobile devices.

User interface 106 can allow a user to register with and configure composing engine 110 (discussed in more detail below) to enable a driver controlling a non-driverless vehicle to participate in a driverless vehicle priority system. It is contemplated that user interface 106 can allow a user to provide any information to composing engine 110.

Server computer 108 can be a standalone computing device, a management server, a web server, a mobile computing device, or any other computing system capable of receiving, sending, and processing data.

It is contemplated that server computer 108 can include a server computing system that utilizes multiple computers as a server system, such as, for example, a cloud computing system.

In other embodiments, server computer 108 can be a computer system utilizing clustered computers and components that act as a single pool of seamless resources when accessed within distributed data processing environment 100.

Database 112 is a repository for data used by composing engine 110. In the depicted embodiment, composing engine 110 resides on server computer 108. However, database 112 can reside anywhere within a distributed data processing environment provided that composing engine 110 has access to database 112.

Data storage can be implemented with any type of data storage device capable of storing data and configuration files that can be accessed and utilized by server computer 108. Data storage devices can include, but are not limited to, database servers, hard disk drives, flash memory, and any combination thereof.

Figure 2:
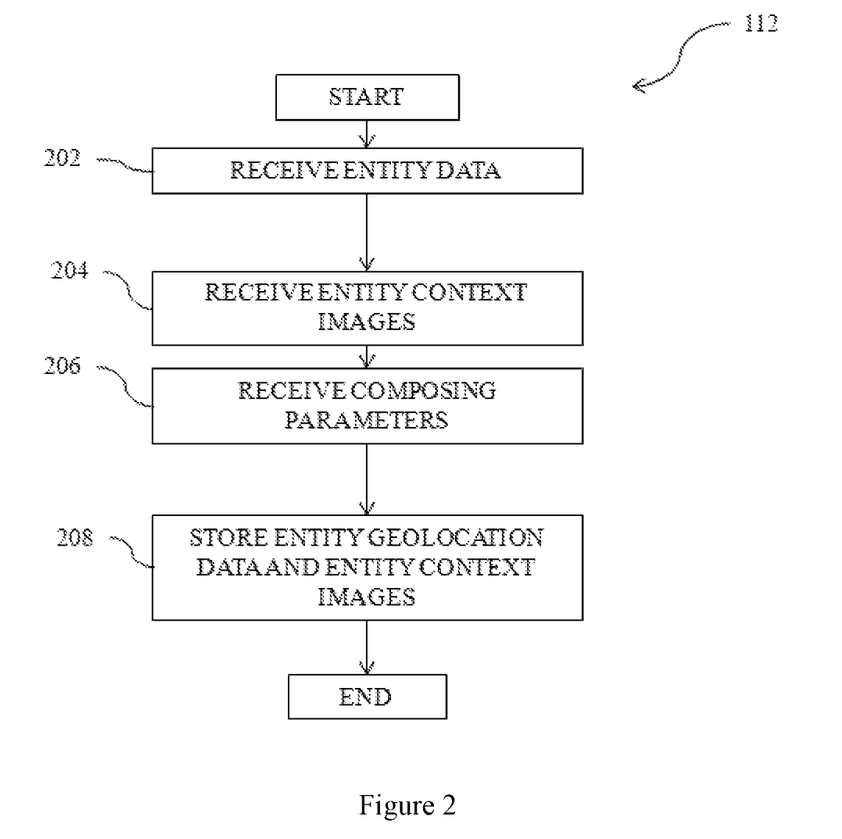
FIG. 2 is a schematic of a method of registering businesses with a composing engine.

FIG. 2 is a schematic of a method of registering businesses with composing engine 110.

Composing engine 110 receives entity data (step 202).

Composing engine 110 enables an entity, including for example, a business organization or a service provider, to reach customers by proxy of social media users. It is contemplated that composing engine 110 works cooperatively with social media content editing software (e.g., social media-integrated photo editing software) to enable composite media to be incorporated into a user's social media posts.

As used herein, entity data comprises any information associated with an entity. In a preferred embodiment, entity data comprises one or more geolocations associated with an entity, one or more time frames, and at least one context image for incorporation into social media posts. For example, a local guitar store can submit the name and address of the business, the geolocation of the guitar store, the geolocation of a local concert venue, and a time frame of Friday-Saturday between the hours of 4:00 PM to 12:00 AM. It is contemplated that entity data allows composing engine 110 to offer particular context images to social media users based on one or more parameters.

The preceding embodiments and examples are merely illustrative, and entities can include any number of composing parameters in entity data. For example, entities can apply a unique set of composing parameters (e.g., time, date, proximity threshold) for each geolocation listed in the entity data. In another example, entities can apply a unique set of composing parameters to particular context images.

Composing engine 110 receives a context image from the entity (step 204).

Context images can include any expression representing the entity, including, for example, sounds, tactile expressions, visuals, and any other sensory expressions. It is contemplated that the entity, in some embodiments, can pay to sponsor context images for specific locations, dates, and times. In other embodiments, the entity can send composing engine 110 one or more context images for free.

In a first embodiment, context images include a particular set of graphic overlays that can be added to a photo to be posted on social media. The graphic overlays can include, but are not limited to, logos, words, videos, and graphics interchange format (GIF) videos.

In a second embodiment, context images include context sounds, including for example, particular set of sounds to a social media post. In a more specific example, context images can include a collection of celebrity catch phrase when a user captures a photo at a concert venue where the celebrity is performing.

In a third embodiment, context images include context tactile expressions. For example, context tactile expressions can trigger vibrations in mobile devices when opening a social media post from a local survival training class that translates to the business name in morse code. In another example, context tactile expressions from a demolition company can cause a smart phone to vibrate as a video of a building being torn down plays.

Composing engine 110 receives composing parameters from the entity (step 206).

Composing parameters include any rules that can be applied to context images. For example, where a local store submits context images that advertise particular sales, each context image can have a particular set of dates and times of day that the context image can be incorporated into a social media post. In another example, composing parameters can include restrictions based on age for context images associated with particular businesses or products (e.g., restricting social media users registered under the age of 21 from context images associated with alcoholic products). It is contemplated that entity data allows composing engine 110 to offer particular context images to social media users based on any one or more parameters.

Composing engine 110 stores the geolocation data and the context images from the entity in database 112 (step 208).

It is contemplated that composing engine 110 stores the geolocation location data, context images, and any parameters associated with the geolocation data and the context images in database 112.

Figure 3:
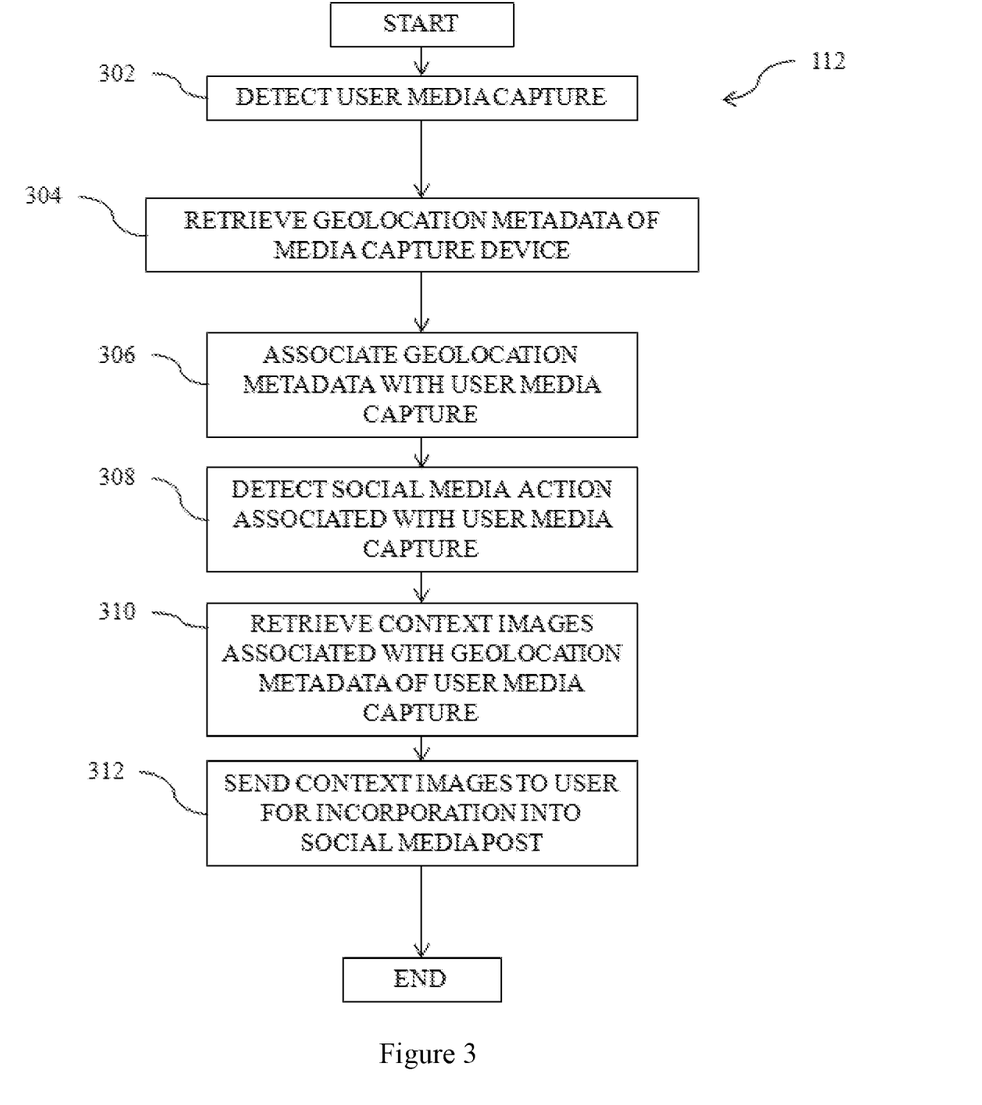
FIG. 3 is a schematic of a method of delivering composite media content relevant to a social media post using the geolocation metadata of a media capture image.

FIG. 3 is a schematic of a method of delivering context images relevant to a social media post using the geolocation metadata of a media capture image.

Composing engine 110 detects a media image captured by a user (step 302).

A user media capture image can include any media captured data associated with any sensor. Sensors can include, but are not limited to, cameras, microphones, accelerometers, and depth sensors. For example, composing engine 110 can detect that a user recorded a video using a camera and a microphone.

In another example, composing engine 110 can detect that a user recorded a video that include depth data, which can be used to include context images in an augmented reality-based environment. For example, if the user recorded a video with depth data at a concert, composing engine 110 could include a context image comprising the bands logo and the location of the concert imposed above the band playing onstage.

In yet another example, composing engine 110 can detect the movements associated with an accelerometer during a video capture to allow the context images included the video to be "knocked around" realistically with corresponding camera shake.

Composing engine 110 retrieves geolocation metadata of the user media capture device (step 304).

Geolocation metadata can include, but is not limited to, using an exchangeable image file format (EXIF) associated with a photo.

It is contemplated that composing engine 110 can work cooperatively with a global position system (GPS) on the media capture device to record data, including, for example, a date, a time of day, a direction (e.g. north, south, east, west, etc.), and geographic coordinates. However, geolocation metadata can include any details associated with the circumstances of the media capture.

Composing engine 110 associates the geolocation metadata with the user media capture (step 306).

Composing engine 110 ties the geolocation metadata to a particular media capture. In some embodiments, composing engine 110 can tie the geolocation metadata to a set of media captures. For example, composing engine 110 can detect and record a set of media captures within one mile of each other and tie a common geolocation metadata to all of the media captures.

Composing engine 110 detects a user-initiated social media action associated with the user media capture (step 308).

A user initiated social media action can be any action associated with a social network. For example, user social media actions can include, but are not limited to, opening a social media program, inputting any one or more commands associated with a social media program, uploading a media file, retrieving a media file, and capturing media.

In a preferred embodiment, composing engine 110 detects a user-initiated social media action that is initiated at a different time and location than the original time and location of the user media capture. For example, composing engine 110 can detect that a user is attempting to post a photo that was taken a week earlier. Based on the geolocation metadata of the user media capture, composing engine 110 can retrieve context images associated with the time, location, and any other parameters associated with the geolocation metadata.

In a more specific example, composing engine 110 can detect that a user is taking the steps to post a video of a rock concert a week ago. Based on the geolocation data associated with the photo, composing engine 110 can send a series of concert-specific logos and filters that are no longer available at the time of the social media post.

Composing engine 110 retrieves one or more context images associated with the geolocation metadata of the user media capture (step 310).

As discussed above, context images can be tied to any one or more composing parameters. In a preferred example, context images are offered for inclusion into a user's social media post based on whether a social media user falls inside or outside of a boundary defining a geofence associated with each context image.

Importantly and as discussed in detail above, composing engine 110 can retrieve context images particular to the geolocation metadata of the user media capture. Composing engine 110 advantageously allows users to delay posting their photos without losing out on the particular context images that were available during that time and location. As such, composing engine 110 streamlines the social media process by enabling users to avoid taking frequent breaks to post on social media in order to take advantage of time-sensitive and location-sensitive context images.

By retrieving context images based on the geolocation metadata of a photo, composing engine 110 advantageously allows users to create archives of photos with context-specific additions at a later time, on their own schedule.

Composing engine 110 sends the context images to the user for incorporation into a social media post (step 312).

It is contemplated that composing engine 110 can additionally track the sharing of context images to determine the reach of an entity's context images. It is further contemplated that an entity can either receive the tracked sharing of the entity's context images for a fee or for free.

Composing engine 110 sends the context images through any medium associated with network 102. In a preferred embodiment, composing engine 110 sends context images to a user's device via a cellular data network. For example, composing engine 110 can send one or more entity logos to a smartphone over a 5G cellular data network.

In another embodiment, composing engine 110 can send context images to a smartphone over a wireless fidelity (WiFi) network. In embodiments where composing engine 110 and database 112 reside on computing device 104, composing engine 110 can send context images to a smartphone via hardwired connections.

Figure 4:
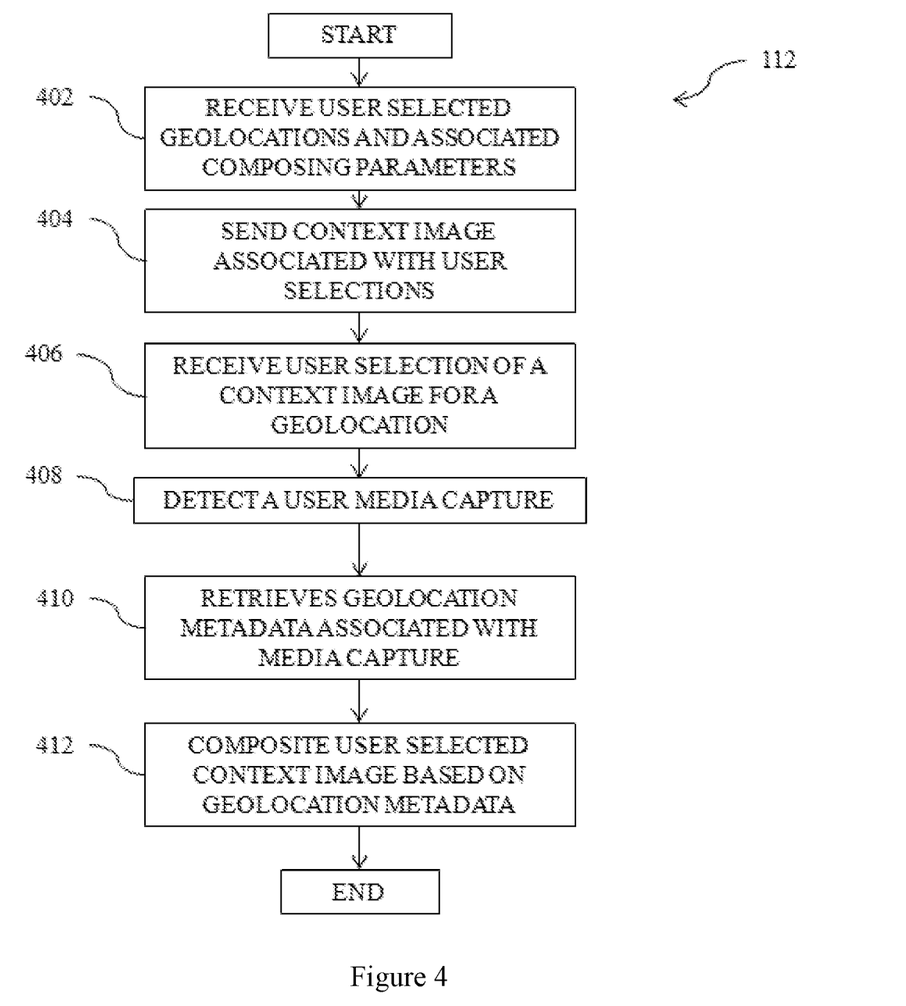
FIG. 4 is a schematic of a method of applying user preselected composite media when a user enters a particular geolocation.

FIG. 4 is a schematic of a method of applying user preselected context images when a user enters a particular geolocation.

Composing engine 110 receives one or more geolocations selected by a user (step 402).

In a preferred embodiment, composing engine 110 receives one or more user selections of geolocations associated with time and date-based parameters. For example, composing engine 110 can receive a first geolocation and a second geolocation and the time and date the user anticipates being at each geolocation.

In a more specific example, composing engine 110 can receive a selection of a concert venue and a food venue and a time designation of 4:00 PM-7:00 PM and 8:00 PM-10:00 PM, respectively. Based on the user-selected geolocations and associated parameters, composing engine 110 can anticipate the relevant context images attach to a user's social media post. For example, composing engine 110 can queue a list of five context images associated with the concert venue that are authorized by the concert venue to be added to social media posts at the designated time.

Composing engine 110 sends context images available for one or more geolocations selected by a user (step 404).

In preferred embodiments, composing engine 110 sends context images that are stored in database 112 for the user-submitted time, date, and location. For example, composing engine 110 can send one or context images for a user to select and place on a sample user media capture to create a template for a future event. In this example, it is contemplated that the user is restricted from posting any content with the future context images until the user captures media that has geolocation metadata that falls within the location and composing parameters.

Composing engine 110 receives a user selection of context images for one or more geolocations (step 406).

It is contemplated that a user can set different template incorporating one or more context images.

It is further contemplated that the user can also submit parameters for inclusion of context images in the same event based on one or more variables. For example, composing engine 110 can receive a user selection of a band logo for an opening act in a concert on any social media posts from 7:00 PM-8:30 PM and a different band logo for a headlining band from 8:30 PM-10:00 PM when the headliner is slotted to play.

Composing engine 110 detects a user media capture (step 408).

A user media capture can include any media capture associated with any sensor. Sensors can include, but are not limited to, cameras, microphones, accelerometers, and depth sensors. For example, composing engine 110 can detect that a user recorded a video using a camera and a microphone.

In another example, composing engine 110 can detect that a user recorded a video that include depth data, which can be used to include context images in an augmented reality-based environment.

In yet another example, composing engine 110 can detect the movements associated with an accelerometer during a video capture to allow the context images included the video to be "knocked around" realistically with corresponding camera shake.

Composing engine 110 retrieves geolocation metadata associated with the media capture (step 410).

It is contemplated that composing engine 110 can work cooperatively with a global position system (GPS) on the media capture device to record data, including, for example, a date, a time of day, a direction (e.g. north, south, east, west, etc.), and geographic coordinates. However, geolocation metadata can include any details associated with the circumstances of the media capture.

Composing engine 110 composites a user selected context image with the media capture based on geolocation metadata (step 412).

Figure 5:
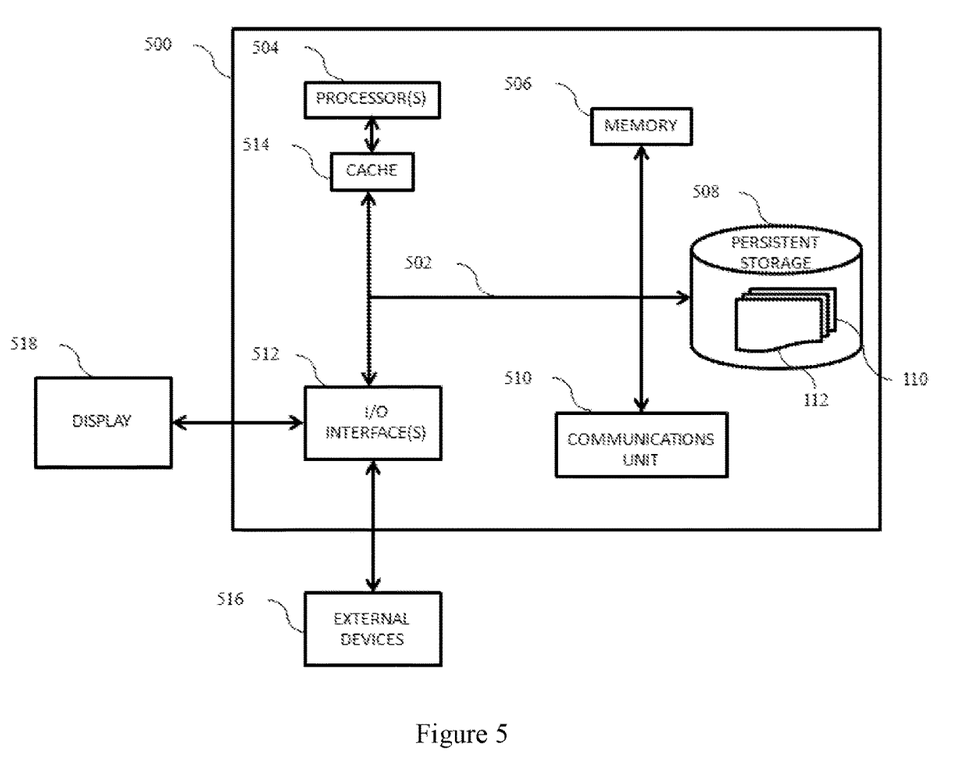
FIG. 5 depicts a block diagram of components of the server computer executing the context image engine within the distributed data processing environment of FIG. 1.

FIG. 5 depicts a block diagram of components of the server computer executing composing engine 110 within the distributed data processing environment of FIG. 1. FIG. 5 is not limited to the depicted embodiment. Any modification known in the art can be made to the depicted embodiment.

In one embodiment, the computer includes processor(s) 504, cache 514, memory 506, persistent storage 508, communications unit 510, input/output (I/O) interface(s) 512, and communications fabric 502.

Communications fabric 502 provides a communication medium between cache 514, memory 506, persistent storage 508, communications unit 510, and I/O interface 512. Communications fabric 502 can include any means of moving data and/or control information between computer processors, system memory, peripheral devices, and any other hardware components.

Memory 506 and persistent storage 508 are computer readable storage media. As depicted, memory 506 can include any volatile or non-volatile computer storage media. For example, volatile memory can include dynamic random access memory and/or static random access memory. In another example, non-volatile memory can include hard disk drives, solid state drives, semiconductor storage devices, a read-only memory (ROM), an erasable programmable read-only memory (EPROM), a flash memory, and any other storage medium that does not require a constant source of power to retain data.

In one embodiment, memory 506 and persistent storage 508 are random access memory and a hard drive hardwired to computing device 104, respectively. For example, computing device 104 can be a computer executing the program instructions of composing engine 110 communicatively coupled to a solid state drive and DRAM.

In some embodiments, persistent storage 508 is removable. For example, persistent storage 508 can be a thumb drive or a card with embedded integrated circuits.

Communications unit 510 provides a medium for communicating with other data processing systems or devices, including data resources used by computing device 104. For example, communications unit 510 can comprise multiple network interface cards. In another example, communications unit 510 can comprise physical and/or wireless communication links.

It is contemplated that composing engine 110, database 112, and any other programs can be downloaded to persistent storage 508 using communications unit 510.

In a preferred embodiment, communications unit 510 comprises a global positioning satellite (GPS) device, a cellular data network communications device, and short to intermediate distance communications device (e.g., Bluetooth®, near-field communications, etc.). It is contemplated that communications unit 510 allows computing device 104 to communicate with other computing devices 104 associated with other users.

Display 518 is contemplated to provide a mechanism to display information from composing engine 110 through computing device 104. In preferred embodiments, display 518 can have additional functionalities. For example, display 518 can be a pressure-based touch screen or a capacitive touch screen.

In yet other embodiments, display 518 can be any combination of sensory output devices, such as, for example, a speaker that communicates information to a user and/or a vibration/haptic feedback mechanism. For example, display 518 can be a combination of a touchscreen in the dashboard of a car, a voice command-based communication system, and a vibrating bracelet worn by a user to communicate information through a series of vibrations.

It is contemplated that display 518 does not need to be physically hardwired components and can, instead, be a collection of different devices that cooperatively communicate information to a user.

It should be apparent to those skilled in the art that many more modifications besides those already described are possible without departing from the inventive concepts herein. The inventive subject matter, therefore, is not to be restricted except in the scope of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . . and N, the text should be interpreted as requiring only one element from the group, not A plus N, or B plus N, etc.

What is claimed is:

1. A method of reducing filtering and composing steps, by utilizing a data store that associates multiple $3^{rd}$ party context images with a geographical area; the method comprising:
   while a user operates a media capture device at a first location within the geographical area; the media capture device (1) captures an image, and (2) promptly associates the user-captured image with location metadata corresponding to the first location;
   carrying the media capture device to a second location outside of the geographical area; and then
   while the media capture device is at the second location, outside of the geographical area and at a time after an event associated with the geographical area has concluded, using the media capture device to:
   (1) use the location metadata to establish that the captured image was obtained within the geographic area during the event, thereby allowing the user to access the multiple $3^{rd}$ party context images associated with the event at the geographical area from the data store;
   (2) select a context image from among the accessed multiple $3^{rd}$ party context images; and
   (3) combine the selected context image with the user-captured image to produce a composite image, wherein the production of the composite image further comprises generating at least one of a future context image and a sample user-capture image, to create a template for a future event and wherein the user is restricted from posting any content that uses the template until the user is within a future event location associated with the future event.

2. The method of claim 1 wherein the composite image is circulated to social media friends of the user.

3. The method of claim 1, wherein the context image comprises at least one of a sensory expression, and a graphic overlay.

4. The method of claim 3, wherein the context image comprises a composing parameter.

5. The method of claim 4, wherein the composing parameter comprises at least one of a product, a set of dates, a set of times, and a restriction.

6. The method of claim 1 wherein inclusion in the data store of at least some of the multiple $3^{rd}$ party context images are sponsored by a third-party merchant.

7. A method of reducing steps for a user to incorporate location-relevant $3^{rd}$ party context images into a social media post, the method comprising:
   while a media capture device is located inside a designated geographical area during an event, using a media capture device to (1) capture an image, and (2) use location metadata from the media capture device to establish that the image was captured within the designated geographical area during the event, thereby rendering the user eligible to receive a selection of the $3^{rd}$ party context images as being associated with the event occurring within the geographical area, and then while the user is located outside a geographical area, (1) selecting a context image from the selection of 3rd party context images, and (2) combining the selected context image with the user-captured image to produce a composite image, wherein the production of the composite image further comprises generating at least one of a future context image and a sample user-capture image, to create a template for a future event; and restricting the user from posting any content that uses the template until the user is within a future event location associated with the future event.

8. The method of claim 7 wherein the composite image is circulated to social media friends of the user.

9. The method of claim 1, wherein the context image comprises at least one of a sensory expression, and a graphic overlay.

10. The method of claim 9, wherein the context image comprises a composing parameter.

11. The method of claim 10, wherein the composing parameter comprises at least one of a product, a set of dates, a set of times, and a restriction.

12. The method of claim 7 wherein inclusion in the data store of at least some of the multiple $3^{rd}$ party context images are sponsored by a third-party merchant.

* * * * *